(12) United States Patent
Zong et al.

(10) Patent No.: US 11,260,464 B2
(45) Date of Patent: Mar. 1, 2022

(54) DEVICE AND METHOD FOR DEBURRING OF METAL WORKPIECE

(71) Applicant: XCMG Construction Machinery Co., Ltd., Jiangsu (CN)

(72) Inventors: Xuemei Zong, Xuzhou (CN); Jianfei Liu, Xuzhou (CN)

(73) Assignee: XCMG CONSTRUCTION MACHINERY CO., LTD., Xuzhou (CN)

( * ) Notice: Subject to any disclaimer, the term of this patent is extended or adjusted under 35 U.S.C. 154(b) by 265 days.

(21) Appl. No.: 16/489,534

(22) PCT Filed: Mar. 3, 2017

(86) PCT No.: PCT/CN2017/075539
§ 371 (c)(1),
(2) Date: Aug. 28, 2019

(87) PCT Pub. No.: WO2018/040526
PCT Pub. Date: Mar. 8, 2018

(65) Prior Publication Data
US 2020/0114445 A1      Apr. 16, 2020

(51) Int. Cl.
*B23H 9/02* (2006.01)
*B23H 3/02* (2006.01)

(52) U.S. Cl.
CPC ............ *B23H 9/02* (2013.01); *B23H 3/02* (2013.01)

(58) Field of Classification Search
CPC .................................................... B23H 9/02
See application file for complete search history.

(56) References Cited

U.S. PATENT DOCUMENTS

| | | |
|---|---|---|
| 3,403,084 A | 9/1968 | Andrews |
| 3,793,170 A | 2/1974 | Andrews |
| 2010/0072077 A1* | 3/2010 | Rohrbeck ............... C25F 7/00 205/670 |

FOREIGN PATENT DOCUMENTS

| | | |
|---|---|---|
| CN | 101879694 | 11/2010 |
| CN | 202622113 | 12/2012 |

(Continued)

OTHER PUBLICATIONS

Koroskenyi, titled "Burlytic Deburring—A New Approach in Electrochemical Deburring," Society of Manufacturing Engineers, MR95-228 (1995), pp. 1-25 (Year: 1995).*

(Continued)

*Primary Examiner* — Nicholas A Smith
(74) *Attorney, Agent, or Firm* — Myers Bigel, P.A.

(57) ABSTRACT

The present disclosure relates to a deburring device and method for a metal workpiece. The deburring device for the metal workpiece includes a power source, an insulating tube, a tank and an electrolyte contained in the tank. A first end of the insulating tube communicates with the electrolyte, and a second end thereof projects into a hole with burrs to be removed in the workpiece. A first pole of the power source is conductive with the workpiece, and a second pole thereof is configured to be conductive with the electrolyte. A gas layer can be formed when the power source is turned on and the electrolyte is introduced into the burr location in the hole through the insulating tube, and the gas layer is broken down under the action of a voltage to remove the burrs.

16 Claims, 2 Drawing Sheets

(56) References Cited

FOREIGN PATENT DOCUMENTS

| | | |
|---|---|---|
| CN | 102873417 | 1/2013 |
| CN | 205904537 | 1/2017 |
| CN | 106624230 | 5/2017 |
| CN | 206653049 | 11/2017 |
| JP | 2002224916 | 8/2002 |

OTHER PUBLICATIONS

Office Action for corresponding CN application No. 201710122011.0 dated Mar. 2, 2018, 5 pages, no translation.

* cited by examiner

DEVICE AND METHOD FOR DEBURRING OF METAL WORKPIECE

RELATED APPLICATIONS

The present application is a 35 U.S.C. § 371 national phase application of PCT International Application No. PCT/CN2017/075539, filed Mar. 3, 2017, the disclosure of which is hereby incorporated herein by reference in its entirety.

FIELD OF THE DISCLOSURE

The present disclosure relates to the technical field of deburring after machining, and in particular relates to a deburring device and method for a metal workpiece.

BACKGROUND OF THE DISCLOSURE

In the field of machining, burrs are generated at incoming and outgoing cutting edges and at crossing locations of inside fine deep holes during machining of metal workpiece blanks. The harm of the burrs is especially serious for precise hydraulic elements. For example, inside a hydraulic valve, there are sharp edges and burrs formed by many deep holes that mutually run through each other. In the working process, the edges and burrs are liable to be stripped due to flushing by high-pressure liquid, such that the inner surface of the hydraulic valve is scrapped, seals are damaged, and liquid string, liquid leakage and oil channel blockage occur. In serious situations, the system pressure even cannot be established, such that the system is out of control, resulting in failure of the whole machine.

Manual deburring and explosion deburring are common deburring methods at present, and can remove burrs at the outer surface, grooves and large-diameter holes of the metal workpiece. However, for the burrs at a crossing location of a fine deep hole with a small diameter or with a large length-diameter ratio inside the metal workpiece, if a manual deburring method is adopted, the target is difficult to position accurately, and the tool can hardly be put into the hole to remove the burrs; and if the explosion deburring method is adopted, due to insufficient combustion in burr explosion, metal built-up edges are very likely to be generated and attached to the inner wall of the hole, thus affecting the surface quality of the hole wall.

Hence, another deburring method emerges in the prior art, specifically as follows. One pole of a power source is connected to a metal workpiece, and the other pole thereof is connected to an electrolyte. When the power source is turned and the metal workpiece is immersed in the electrolyte, gas generated in electrolysis and gas generated through heat release by shorting form a mixed gas layer in the hole of the workpiece and isolate the workpiece from the electrolyte, and the gas layer is broken down under the action of a voltage to remove the burrs.

Although this deburring method is simpler and easier to operate, it is found in actual use that such a method for removing burrs through instantaneous shorting between the metal workpiece and the electrolyte is still ineffective in removing the burrs in a fine deep hole, especially at a crossing location, inside the workpiece.

SUMMARY OF THE DISCLOSURE

Embodiments of the present disclosure provide a deburring device and method for a metal workpiece, by means of which burrs in a hole of the metal workpiece can be removed more thoroughly.

A first aspect of the present disclosure provides a deburring device for a metal workpiece, including: a power source, an insulating tube, a tank, the tank is used for containing an electrolyte, wherein a first end of the insulating tube is communicated with the electrolyte, and a second end of the insulating tube is configured to stretch into a hole with burrs to be removed in a workpiece; a first pole of the power source is configured to be conductive with the workpiece, and a second pole of the power source is conductive with the electrolyte; and a gas layer can be formed when the power source is turned on and the electrolyte is introduced into the burr location in the hole through the insulating tube, and the gas layer is broken down under the action of a voltage so as to remove the burrs.

In some embodiments, the second end of the insulating tube stretches into a location close to the burrs in the hole.

In some embodiments, the workpiece is entirely located outside the electrolyte.

In some embodiments, the deburring device for a metal workpiece further includes a first wire, a first end of the first wire is connected with the second pole of the power source, and a second end of the first wire is inserted into the insulating tube close to the burrs.

In some embodiments, the deburring device for a metal workpiece further includes a pressurizing component arranged on the insulating tube, for providing power for the electrolyte in the tank to be conveyed to the burr position of the hole.

In some embodiments, the deburring device for a metal workpiece further includes a control component, the pressurizing component comprises a flow adjustable pump, and the control component is capable of quantitatively adjusting the flow of the pump.

In some embodiments, the deburring device for a metal workpiece further includes a workbench set above the electrolyte for placing the workpiece, wherein the workbench and the workpiece are conducive with each other, and the first pole of the power source is electrically connected to the workbench.

In some embodiments, the deburring device for a metal workpiece further includes a clamping component for transferring the workpiece to the workbench and/or limiting the workpiece.

In some embodiments, the hole on the workpiece is a through hole, so that the electrolyte and gas flow out from an end of the through hole away from the insulating pipe after deburring.

In some embodiments, the deburring device for a metal workpiece further includes a filtering component for filtering the electrolyte during the process in which the electrolyte flows back from the hole to the tank.

A second aspect of the present disclosure provides a deburring method for a metal workpiece, including the following steps:

communicating a first end of an insulating tube with an electrolyte contained in a tank, and stretching a second end of the insulating tube into a hole with burrs to be removed in the workpiece;

making a first pole of the power source be conductive with the workpiece; and turning on the power source, to make a second pole of the power supply be conductive with the electrolyte, so that the electrolyte is introduced into the burr position of the hole through the insulating tube to form a gas layer, and the gas layer is broken down under the action of a voltage to remove the burrs.

In some embodiments, the step of stretching a second end of the insulating tube into a hole in the workpiece is specifically including:

stretching the second end of the insulating tube into a location close to the burrs in the hole.

In some embodiments, before the step of turning on the power source, the method further includes:

connecting one end of the first wire with the second pole of the power source, and inserting the other end of the first wire into the insulating tube close to the burrs.

In some embodiments, before the step of turning on the power source, the method further includes:

placing the workpiece on the workbench above the electrolyte, so that the workpiece is entirely located outside the electrolyte.

In some embodiments, the step of making the first pole of the power source be conductive with the workpiece specifically includes:

connecting the first pole of the power source with the workbench, so that the workbench and the workpiece arranged on the workbench can be electrically conducive with each other.

In some embodiments, the step of placing the workpiece on the workbench above the electrolyte specifically includes:

transferring the workpiece to the workbench by a clamping component; and/or limiting the workpiece by a clamping component.

In some embodiments, the step of introducing the electrolyte into the burr location in the hole through the insulating tube specifically includes:

initiating a pressurizing component set on the insulating tube, so as to provide power for the electrolyte in the tank to be conveyed to the burr part of the hole.

In some embodiments, the pressurizing component includes a flow adjustable pump, and the deburring method for the metal workpiece further includes:

adjusting the flow of the pump quantitatively according to the diameter of the hole by a control component before or during the deburring operation.

Based on the above technical solution, in the embodiments of the deburring device for the metal workpiece in the present disclosure, the electrolyte in the tank can be guided to a location close to the burrs in the hole of the workpiece through the insulating tube, which reduces the contact area of the electrolyte in the hole for reaction with the workpiece, so that gas generated in the hole is reduced. In this way, the electrolyte can smoothly reach the burr location for reaction, and the gas produced after the reaction can be discharged from the hole smoothly; furthermore, the voltage consumed by the electrolyte in the hole can be reduced, so that the energy generated by the actual voltage applied by the power source to the burr location at the time of shorting is sufficient to remove the burrs. These advantages can optimize the deburring effect and improve the deburring efficiency.

BRIEF DESCRIPTION OF THE ACCOMPANYING DRAWINGS

The drawings described herein are used for providing a further understanding of the present disclosure, and constitute a part of the present application. The illustrative embodiments of the present disclosure and the descriptions thereof are used for explaining the present disclosure and do not constitute improper limitation to the present disclosure. In the drawings.

DETAILED DESCRIPTION OF THE PREFERRED EMBODIMENTS

Figure 1:
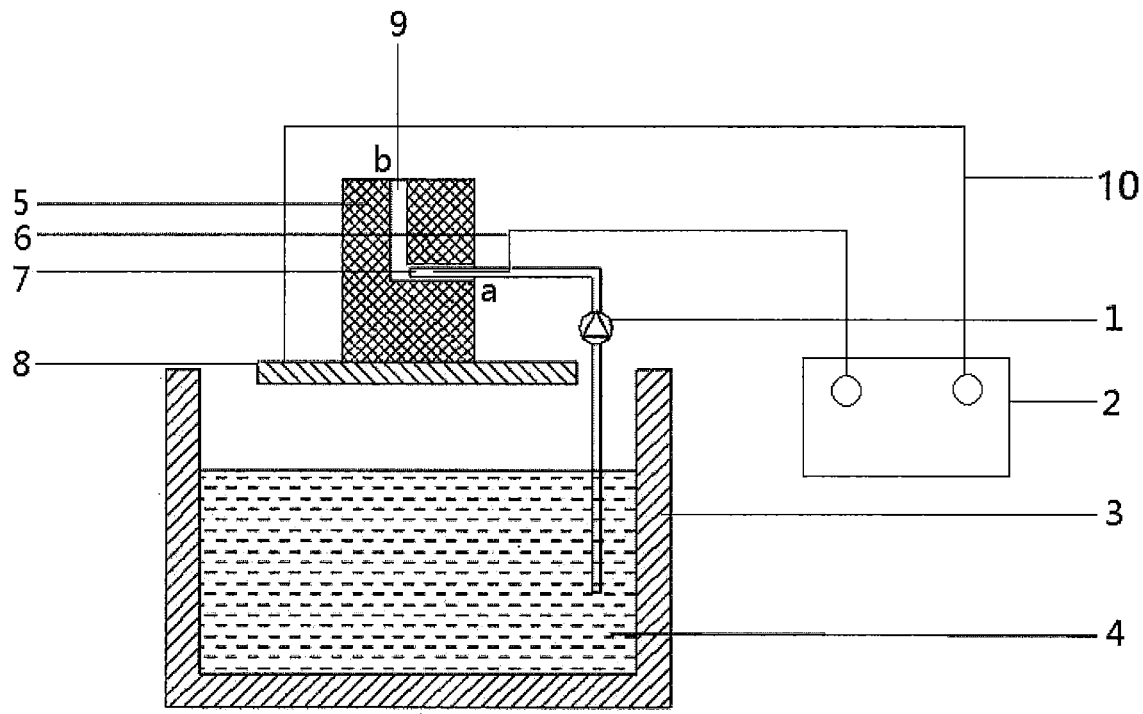
FIG. 1 is a structure diagram of an embodiment of a deburring device for a metal workpiece in the present disclosure.

The present disclosure will be described in detail below. In the following paragraphs, different aspects of the embodiments are defined in more detail. The aspects so defined can be combined with any other one or more aspects, unless otherwise noted expressly. Particularly, any featured considered as preferred or advantageous can be combined with other one or more features considered as preferred or advantageous.

The words "first", "second" and the like in the present disclosure are intended to facilitate description, to distinguish different components with the same name, but do not denote precedence or primary and secondary relationship.

In the description of the present disclosure, it should be understood that the orientational or positional relationship denoted by the terms "upper", "lower", "left", "right", "inside" and "outside" is based on the orientational or positional relationship shown in the drawings, only for the convenience of describing the present disclosure, rather than indicating or implying that the denoted device must have a particular orientation, or be constructed and operated in a particular orientation, and therefore should not to be construed as limiting the protection scope of the present disclosure.

It is discovered that the existing method for removing burrs through transient shorting between a metal workpiece and an electrolyte cannot effectively remove the burrs at crossing locations of fine deep holes inside the workpiece. The inventor finds the main reasons as follows: firstly, after an electrolyte is immersed in the hole, during the process of reaching the burr, it will come into contact with the hole wall and cause short circuit to generate a large amount of water vapor. If the hole diameter is small, the gas expelling condition will be poor, and the pressure formed by the water vapor in the hole will obstruct the electrolyte from reaching the deep location of the hole of the workpiece to continue the deburring reaction; secondly, the electrolyte will generate a voltage loss during the internal flow of the fine deep hole, resulting in that the actual voltage reaching the burrs at the crossing location is much lower than the working voltage, and thus the energy generated at the burrs when the gas layer is broken down is insufficient to completely remove the burrs.

According to the above idea, the present disclosure provides an improved deburring device for a metal workpiece. In some embodiments, as shown in FIG. 1, wherein the deburring device for a metal workpiece includes a power source 2, an insulating tube 7, a tank 3, the tank 3 is used for containing an electrolyte 4, a first end of the insulating tube 7 is communicated with the electrolyte 4, and a second end of the insulating tube 7 is configured to stretch into a hole with burrs to be removed in the workpiece 5 and does not go beyond the burr location; a first pole of the power source 2 is configured to be conductive with the workpiece 5 directly or indirectly, and a second pole power source 2 is conductive with the electrolyte 4; and a gas layer can be formed when the power source 2 is turned on and the electrolyte 4 is introduced into the burr location in the hole through the insulating tube 7, and the gas layer is broken down under the action of a voltage so as to remove the burrs.

Such a deburring device is adapted to remove burrs in various holes such as cross holes, blind holes, straight holes and the like, and the cross-section shape of the hole in the workpiece 5 is not limited. The insulating tube 7 can be an insulating hose to improve the adaptability during installation and connection. The electrolyte 4 is prepared from a neutral salt with a low concentration, and is prone to ionization and is pollution-free. Moreover, adopting the low-concentration electrolyte 4 not only can reduce the usage amount of the solute to save the cost, but also can control the reaction speed so that the reaction is not too drastic.

When the deburring device of the embodiment is working, the power source 2 is turned on, the electrolyte 4 in the tank 3 can be guided through the insulating tube 7 to a location in the hole close to the burrs. After the electrolyte 4 leaves the insulating tube 7, instantaneous shorting occurs between the workpiece 5 and the electrolyte 4 to release a large quantity of heat, which quickly vaporizes water in the electrolyte 4 in a short time to form water vapor, and the electrolyte 4 and the inner wall of the electrolyte 4 are isolated by a gas layer. Furthermore, the gas layer is broken down under the action of a voltage, and a tip part formed by the burrs is more sensitive to the voltage. The action of the voltage and the generated heat remove the burrs.

In the embodiment of such a deburring device, the electrolyte 4 can be directly guided to a location close to the burrs through the insulating tube, which reduces the contact area of the electrolyte in the hole for reaction with the workpiece, so that gas generated in the hole is reduced and the pressure is lowered. In this way, the electrolyte 4 can smoothly reach the burr location for reaction, and the gas produced after the reaction can be discharged from the hole smoothly; furthermore, the voltage consumed by the electrolyte 4 in the hole can be reduced, so that the energy generated by the actual voltage applied by the power source 2 to the burr location at the time of shorting is sufficient to remove the burrs. These advantages can optimize the deburring effect and improve the deburring efficiency.

In the above embodiment, the deburring effect can be better than that in the solution of the prior art as long as the second end of the insulating tube 7 is put into a preset length of the hole. Preferably, the second end of the insulating tube 7 is put into a location close to the burrs in the hole, such that the electrolyte 4 can react with the workpiece 5 directly at the burr location, and gas generated in the hole is reduced as much as possible; moreover, the actual voltage applied to the burr location by the power source 2 is close to the provided voltage, and energy loss is minimized so as to remove the burrs more completely and shorten the deburring time.

In some embodiments, the workpiece 5 is partially immersed in the electrolyte 4 when remove the burrs, and make insulation protection for the outer surface of the workpiece 5, and the insulating tube 7 is inserted into one end of the hole; a first pole of the power source 2 is directly connected to the workpiece 5, and a second pole of the power source 2 is connected to the electrolyte 4 directly through a wire.

In some embodiments, referring to FIG. 1, a workbench 8 is set above the electrolyte 4, and the workpiece 5 is placed on the workbench 8, wherein the workpiece 5 is entirely located outside the electrolyte 4. A first end of the insulating tube 7 is put into the electrolyte 4, and a second end of the insulating tube 7 is put into a hole with burrs to be removed in the workpiece 5 and does not go beyond the burr location.

Correspondingly, in order to make the second pole of the power source 2 be conductive with the electrolyte 4, the deburring device for a metal workpiece further includes a first wire 6, such as a metal wire, one end of the first wire 6 being connected with the second pole of the power source 2, and the other end of the first wire 6 is inserted into the insulating tube 7. In this way, as the insulating tube 7 introduces the electrolyte 4 to the burr location, the second pole of the power source 2 can be conductive with the electrolyte 4. Placing the workpiece 5 outside the electrolyte 4 can make the operation simple and convenient and is good in feasibility. Moreover, the outer surface of the workpiece 5 does not need insulation protection before the deburring operation, and is easy to clean after the deburring operation.

For a fine deep hole, if the second end of the first wire 6 is far from the burr location, and due to the small cross-section area of the insulating tube 7, the electrical resistance of the electrolyte 4 flowing from the second end of the first wire 6 to the burr location is large, which result in a large voltage loss. Preferably, the second end of the first wire 6 is stretched into a location close to the burrs in the insulating tube 7. It can reduce the voltage loss generated when the electrolyte 4 flows in the insulating tube 7, lower the polishing voltage and reduce the cost. Specifically, the second end of the first wire 6 can be stretched into the insulating tube 7 from a location of the insulating tube 7 outside the workpiece 5, and extends along the insulating tube 7 in the hole to the location close to the burrs.

In order to make the electrolyte 4 flow smoothly from the tank 3 to the burr location of the workpiece 5 through the insulating tube 7, the deburring device for a metal workpiece of the present disclosure can further include a pressurizing component arranged on the insulating tube 7, for providing power for the electrolyte 4 in the tank 3 to be conveyed to the burrs location of the hole.

Further, the deburring device of the present disclosure further includes a control component, the pressurizing component includes a pump 1, the flow of the pump 1 is adjustable, and the control component is capable of quantitatively adjusting the flow of the pump 1. After the power source 2 is turned on, the pump 1 can provide power to guide the electrolyte 4 in the tank 3 to the burr location in the workpiece 5 through the insulating tube 7. Before and during the deburring operation, the flow of the pump can be controlled accurately through the control component to control the flow of the electrolyte 4, thereby meeting deburring requirement of different hole sizes.

The deburring device of the present disclosure is particularly suitable for situations where the hole of the workpiece 5 is a through hole, such as a cross hole 9, a straight hole, a curved hole or the like. In this way, after the electrolyte 4 enters the hole and the burrs are removed, the electrolyte and the vapor flow out together from the opening of the through hole away from the insulating tube 7. As the flow of the electrolyte 4 introduced into the insulating tube 7 is large, the water vapor generated after the electrolyte 4 reacts with the burr location flows out together with the electrolyte 4, from the opening far away from the insulating tube 7. As deburring this type of workpiece, it is favorable for the discharge of electrolyte 4 and gas, and the device is also suitable for a hole with a small diameter. If the hole of the workpiece 5 is a blind hole, the diameter of the insulating tube 7 needs to be smaller than the diameter of the hole, so that the electrolyte 4 after reaction together with the water vapor flow out from the clearance between the insulating tube 7 and the hole.

Further, the deburring device further includes a filtering component for filtering the electrolyte 4 during the process in which the electrolyte 4 flows back from the hole to the tank 3, so as to remove metal filings and other impurities in the electrolyte 4 and improve the purity of the electrolyte 4, thereby increasing the deburring efficiency.

As mentioned above, the first pole of the power source 2 is electrically connected with the workpiece 5. Considering that the workpiece 5 on the workbench 8 is often changed, in order to reduce repeated work, the workbench 8 and the workpiece 5 arranged on the workbench 8 can be electrically conducive with each other, and the first pole of the power source 2 is connected with the workbench 8 through a second wire 10, so the first pole of the power source 2 is conducive with the workpiece 5 indirectly. As the position of the workbench 8 is kept unchanged, the first pole of the power source 2 only needs to be connected once to remove burrs of the workpiece 5 in batches. This can improve the production efficiency and ensure the reliability of the connection of the second wire 10.

Further, the deburring device can further include a clamping component for transferring the workpiece 5 to the workbench 8 and/or limiting the workpiece 5. For the workpiece 5 with a high weight, such as a valve body, the clamping component can be used to conveniently moving the workpiece 5 from other location to the workbench 8, and limit the workpiece 5 on the workbench 8, thereby preventing the workpiece 5 from moving during the deburring operation to affect the deburring effect.

To improve the processing efficiency, the workbench 8 can be provided with a plurality of workstations for placing the workpieces 5 to carry out deburring processing at the same time. The clamping component can keep a plurality of workpieces 5 in their respective workstations and prevent mutual influences.

To enable those skilled in the art to understand the working principle of the deburring device of the present disclosure more clearly, description is made in conjunction with the particular embodiment shown in FIG. 1, wherein the burrs are located at the crossing position of holes in the workpiece 5.

(1) Preparation:

Placing the workpiece 5 horizontally on the workbench 8, wherein a first opening a of the cross hole 9 in the workpiece 5 faces rightward, and a second opening b of the cross hole 9 faces upward.

Connecting the first pole of the power source 2 with the workbench 8 through the second wire 10, and a first end of the first wire 6 is connected with the second pole of the power source 2, and a second end of the first wire 6 is inserted into the insulating tube 7 from a side wall of the insulating tube 7 and extends to a location close to the second end of the insulating tube 7.

Inserting the first end of the L-shaped insulating tube 7 into the electrolyte 4 in the tank 3, and putting the second end of the insulating tube 7 from the first opening a of the cross hole 9 into the hole of the workpiece 5 close to the burr location. In this way, the insulating tube 7 and the first wire 6 can reach the burrs at the cross location accurately, and the electrolyte is guided to the cross location through the insulating tube 7, such that the electrolyte 4 contacts with the burr location directly.

(2) Deburring Process:

The flow of the pump 1 can be controlled through the control component to control the flow of the electrolyte 4 to match with the hole size. When the power source 2 is turned on, the electrolyte 4 is guided from the inside of the tank 3 directly to the burr location in the cross hole 9 through the insulating tube 7 under the action of the power of the pump 1.

At this time, the electrolyte 4 is electrolyzed to generate a small amount of gas, and meanwhile, instantaneous shorting occurs between the workpiece 5 and the electrolyte 4 to release a large quantity of heat, which quickly vaporizes water in the electrolyte 4 to water vapor in a short time, and the electrolyte 4 is isolated from the burr location in the hole by a gas layer. Furthermore, the gas layer is broken down under the action of a voltage, and a tip part formed by the burrs is more sensitive to the voltage. The action of the voltage and the generated heat remove the burrs.

The electrolyte 4 together with the water vapor flow out from the second opening b at a speed after the reaction, and returns to the tank 3. In the deburring process, the flow of the pump 1 can also be adjusted according to actual conditions to achieve the optimal deburring effect.

(3) After Deburring:

Turning off The power source 2, pulling out the insulating tube 7, removing the workpiece 5 from the workbench 8 through the clamping component, and cleaning the workpiece 5.

In the particular embodiment, the lengths of the insulating tube 7 and the first wire 6 can be determined according to the length of the hole in the workpiece 5. In large-scale industrial production of the workpieces 5, special clamping components and insulating tubes 7 can be developed for the workpieces 5 with different structures, and deburring operation can be carried out simultaneously on a plurality of workpieces 5 to improve the production efficiency and reduce the cost.

Such a deburring device is simple and convenient to operate and good in feasibility, and can remove the burrs at the crossing location of the fine deep hole inside the workpiece 5 effectively. Moreover, deburring by using the principle of short circuit heat release of power supply and discharge breakdown gas layer can improve efficiency. In addition, it does not need to prepare corresponding electrodes according to the specific structure of the workpiece, thereby improving the universality, meeting the requirement of carrying out the deburring operation on multiple holes at the same time, and also reducing the equipment and process cost needed for deburring. Such a deburring device is especially suitable for parts with many deep holes that run through each other, such as valve bodies.

Figure 2:
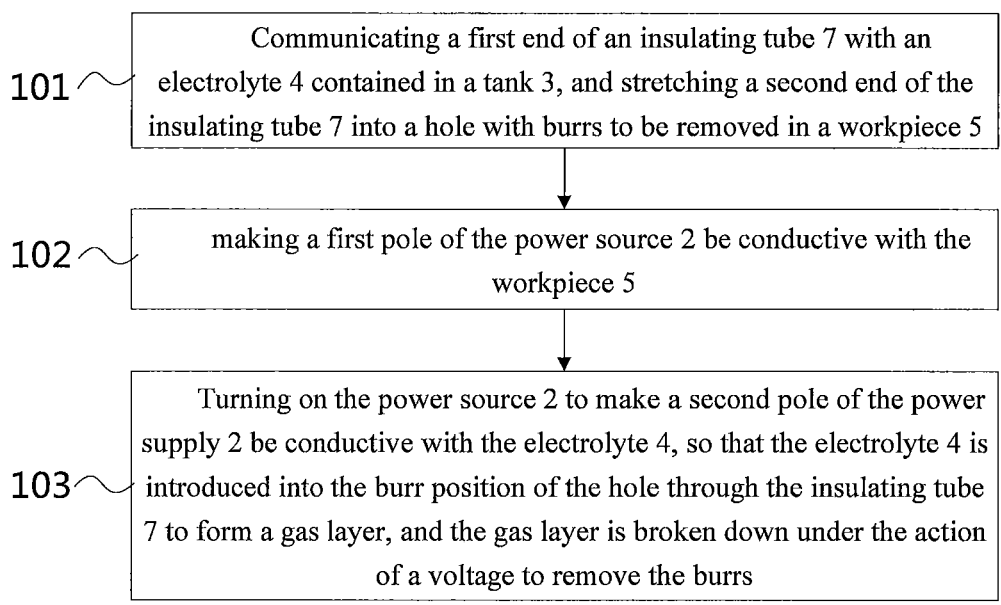
FIG. 2 is a flow diagram of an embodiment of a deburring method for a metal workpiece in the present disclosure.

In addition, the present disclosure also provides a deburring method for a metal workpiece. For this section, The contents of this part and the technical features and effects of deburring device can be used for reference. In a schematic embodiment, as show in the flow diagram of FIG. 2, the deburring method includes the following steps:

step 101, communicating a first end of an insulating tube 7 with an electrolyte 4 contained in a tank 3, and stretching a second end of the insulating tube 7 into a hole with burrs to be removed in the workpiece 5;

step 102, making a first pole of the power source 2 be conductive with the workpiece 5; and step 103, turning on the power source 2 to make a second pole of the power supply 2 be conductive with the electrolyte 4, so that the electrolyte 4 is introduced into the burr position of the hole through the insulating tube 7 to form a gas layer, and the gas layer is broken down under the action of a voltage to remove the burrs.

The sequence of executing steps 101 and 102 is interchangeable, and step 103 is executed after steps 101 and 102.

Preferably, the step of putting a second end of the insulating tube 7 into a hole in the workpiece 5 is specifically: stretching the second end of the insulating tube 7 into a location close to the burrs in the hole.

In this way, the electrolyte 4 can be directly guided to the burr location through the insulating tube 7, such that the electrolyte 4 can react with the workpiece 5 directly at the burr location, and gas generated in the hole is reduced as much as possible; moreover, the actual voltage applied to the burr location by the power source 2 is close to the provided voltage, and energy loss is minimized, so as to remove the burrs more completely and shorten the deburring time.

Figure 3:
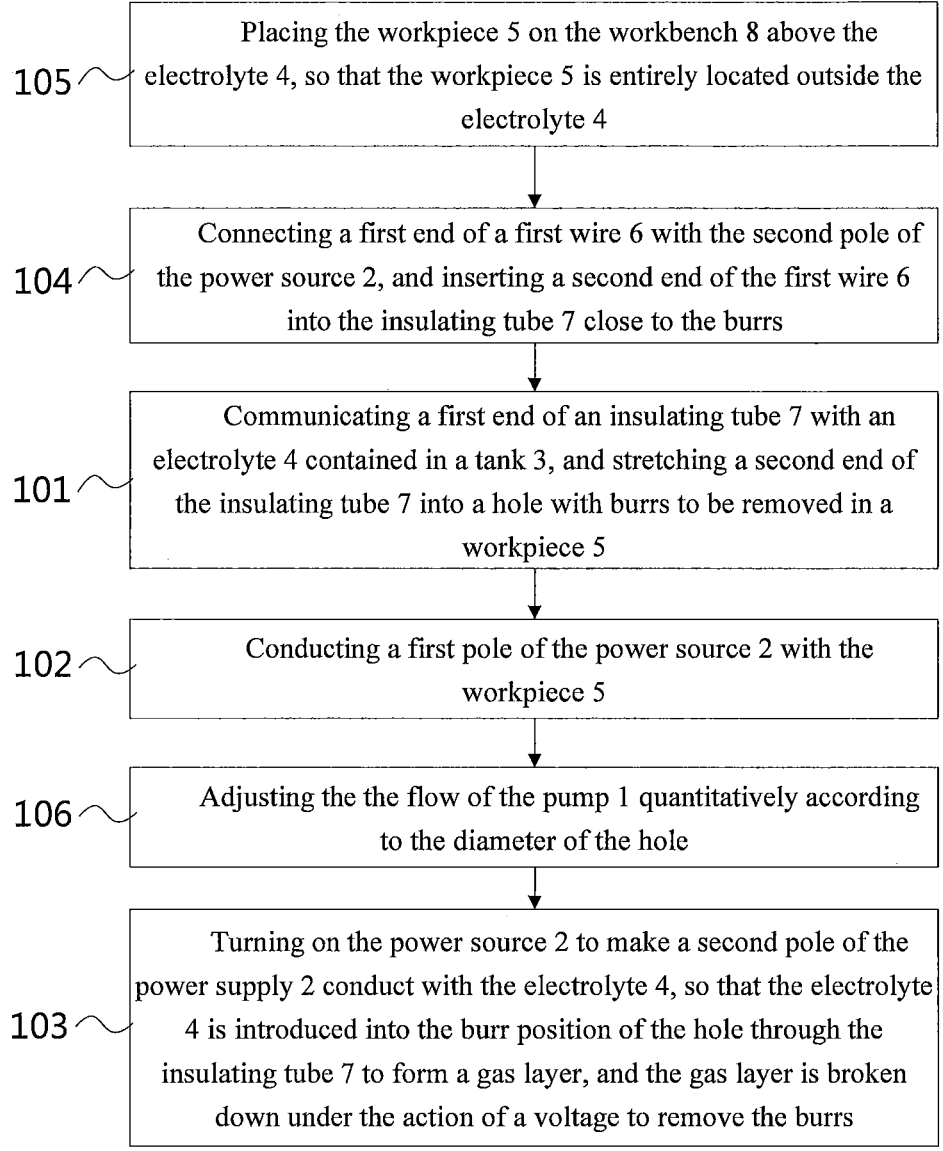
FIG. 3 is a flow diagram of another embodiment of a deburring method for a metal workpiece in the present disclosure.

Further, in step 103, before turning on the power source 2, as show in the flow diagram of FIG. 3, the deburring method further includes:

step 104, connecting a first end of the first wire 6 with the second pole of the power source 2, and inserting a second end of the first wire 6 into a location close to the burrs in the insulating tube 7.

The sequence of executing steps 104 and steps 101 and 102 is not defined. In actual operation, the insulating tube 7 can be inserted into the hole of the workpiece 5 by step 101, and then the first wire 6 is inserted into the insulating tube 7 by step 104. It is also possible that the first wire 6 is inserted into the insulating tube 7 by step 104, and then the insulating tube 7 is mounted by step 101. In this way, the connecting difficulty of the first wire 6 can be reduced, and the location of the first wire 6 inserted into the insulating tube 7 can be easily observed, to improve the controllability of the deburring result.

Further, in step 103, before turning on the power source 2, still referring to FIG. 3, the deburring method further includes:

step 105, placing the workpiece 5 on the workbench 8 above the electrolyte 4, so that the workpiece 5 is entirely located outside the electrolyte 4.

Placing the workpiece 5 outside the electrolyte 4 can make the operation simple and convenient and is good in feasibility. Moreover, it is not necessary to make insulate protection for the workpiece 5 before deburring, and it is easy to clean after deburring. The sequence of executing steps 105 and steps 101, 102 and 104 is not defined. Preferably, step 105 is executed before step 101, the insulating tube 7 is inserted into the hole of the workpiece 5 after the workpiece 5 is in place, which can ensure that the insulating tube 7 is accurately inserted into the location close to the burrs in the hole.

For the embodiment in which the workbench 8 is placed on the workbench 8, step 102 specifically includes: connecting the first pole of the power source 2 with the workbench 8, so that the workbench 8 and the workpiece 5 arranged on the workbench 8 can be conductive with each other.

Further, step 105 specifically includes:
transferring the workpiece 5 to the workbench 8 by a clamping component; and
limiting the workpiece 5 by the clamping component.

One of the two operations executed by the clamping component may be selected.

In another embodiment, especially for an embodiment where the workpiece 5 is placed outside the electrolyte 4, the insulating tube 7 is provided with a pressurizing component, which can be additionally provided with a power source to supply power. In step 103, the step of introducing the electrolyte 4 into the burr location in the hole through the insulating tube 7 specifically includes:

actuating the pressurizing component arranged on the insulating tube 7 to convey the electrolyte 4 in the tank 3 into the burr location in the hole.

Further, the pressurizing component is a flow adjustable pump 1, and still referring to FIG. 3, the deburring method for the metal workpiece further includes:

step 106, quantitatively adjusting the flow of the pump 1 by a control component. Step 106 can be executed before or during the deburring operation.

The deburring device and method for a metal workpiece provided by the present disclosure are introduced in detail above. Particular embodiments are applied herein to illustrate the principle and implementations of the present disclosure. The above description of the embodiments is only intended to facilitate understanding the method of the present disclosure and its core idea. It should be noted that for those of ordinary skill in the art, a number of improvements and modifications can be made to the present disclosure without departing from the principle of the present disclosure, and these improvements and modifications also fall into the protection scope of the claims of the present disclosure.

The invention claimed is:

1. A deburring device for a metal workpiece, comprising:
a tank for containing an electrolyte;
an insulating tube, a first end of the insulating tube communicating with the electrolyte, and a second end of the insulating tube configured to stretch into a hole with burrs to be removed in a workpiece;
a power source, a first pole of the power source configured to be conductive with the workpiece, and a second pole of the power source being conductive with the electrolyte; and
a first wire, a first end of the first wire is connected with the second pole of the power source, and a second end of the first wire is inserted into the insulating tube close to the burrs and does not exceed the second end of the insulating tube;
wherein when the power source is turned on, the electrolyte is introduced into the burr position of the hole through the insulating tube and forms a gas layer, and the gas layer is broken down under the action of a voltage so as to remove the burrs.

2. The deburring device for a metal workpiece of claim 1, wherein the second end of the insulating tube stretches into a location close to the burrs in the hole.

3. The deburring device for a metal workpiece of claim 1, wherein the workpiece is entirely located outside the electrolyte.

4. The deburring device for a metal workpiece of claim 1, further comprising a pressurizing component arranged on the insulating tube, for providing power for the electrolyte in the tank to be conveyed to the burrs position of the hole.

5. The deburring device for a metal workpiece of claim 4, wherein the pressurizing component comprises a pump, the flow of the pump is adjustable.

6. The deburring device for a metal workpiece of claim 1, further comprising a workbench set above the electrolyte for placing the workpiece, wherein the workbench and the workpiece are conductive with each other, and the first pole of the power source is electrically connected to the workbench.

7. The deburring device for a metal workpiece of claim 6, further comprising a clamping component for transferring the workpiece to the workbench and/or limiting the workpiece.

8. The deburring device for a metal workpiece of claim 1, wherein the hole is a through hole, so that the electrolyte and gas flow out from an end of the through hole away from the insulating pipe after deburring.

9. The deburring device for a metal workpiece of claim 1, further comprising a filtering component for filtering the electrolyte during the process in which the electrolyte flows back from the hole to the tank.

10. A deburring method for a metal workpiece, comprising:
    communicating a first end of an insulating tube with an electrolyte contained in a tank, and stretching a second end of the insulating tube into a hole with burrs to be removed in a workpiece;
    making a first pole of a power source be conductive with the workpiece; and
    turning on the power source to make a second pole of the power supply be conductive with the electrolyte, so that the electrolyte is introduced into the burr position of the hole through the insulating tube to form a gas layer, and the gas layer is broken down under the action of a voltage to remove the burrs;
    wherein before turning on the power source, the method further comprising:
    connecting a first end of a first wire with the second pole of the power source, and
    inserting a second end of the first wire into the insulating tube close to the burrs, wherein the second end of the first wire does not exceed the second end of the insulating tube.

11. The deburring method for a metal workpiece of claim 10, wherein stretching a second end of the insulating tube into a hole with burrs to be removed in the workpiece comprises:
    stretching the second end of the insulating tube into a location close to the burrs in the hole.

12. The deburring method for a metal workpiece of claim 10, wherein before turning on the power source, the method further comprising:
    placing the workpiece on a workbench above the electrolyte, so that the workpiece is entirely located outside the electrolyte.

13. The deburring method for a metal workpiece of claim 12, wherein making the first pole of a power source be conductive with the workpiece comprises:
    connecting the first pole of the power source with the workbench electrically, wherein the workbench and the workpiece are conductive with each other.

14. The deburring method for a metal workpiece of claim 12, wherein placing the workpiece on the workbench above the electrolyte comprises:
    transferring the workpiece to the workbench by a clamping component; and/or
    limiting the workpiece by a clamping component.

15. The deburring method for a metal workpiece of claim 10, introducing the electrolyte into the burr location of the hole through the insulating tube comprises:
    initiating a pressurizing component set on the insulating tube, so as to provide power for the electrolyte in the tank to be conveyed to the burrs part of the hole.

16. The deburring method for a metal workpiece of claim 15, wherein the pressurizing component comprises a flow adjustable pump, and the method further comprising:
    adjusting the flow of the pump quantitatively according to the diameter of the hole before or during the deburring process.

* * * * *